United States Patent
Griffin et al.

(10) Patent No.: US 8,724,317 B2
(45) Date of Patent: May 13, 2014

(54) APPARATUS PERTAINING TO A DEPLOYABLE KEYBOARD AND CORRESPONDING BOTTOM SURFACE

(75) Inventors: Jason Tyler Griffin, Kitchener (CA); Martin Philip Riddiford, London (GB)

(73) Assignee: BlackBerry Limited, Waterloo (CA)

( * ) Notice: Subject to any disclaimer, the term of this patent is extended or adjusted under 35 U.S.C. 154(b) by 20 days.

(21) Appl. No.: 13/532,113

(22) Filed: Jun. 25, 2012

(65) Prior Publication Data

US 2013/0342972 A1 Dec. 26, 2013

(51) Int. Cl.
- H05K 5/00 (2006.01)
- H05K 7/00 (2006.01)
- G06F 1/16 (2006.01)
- H04M 1/00 (2006.01)

(52) U.S. Cl.
USPC ............... 361/679.56; 361/679.3; 455/575.1; 455/575.4

(58) Field of Classification Search
USPC ............. 361/679.56, 679.3; 455/575.1, 575.4
See application file for complete search history.

(56) References Cited

U.S. PATENT DOCUMENTS

| | | | |
|---|---|---|---|
| 5,712,760 A * | 1/1998 | Coulon et al. | 361/679.15 |
| 7,889,483 B2 * | 2/2011 | Sip et al. | 361/679.11 |
| 7,916,473 B2 * | 3/2011 | Jang | 361/679.55 |
| 2006/0128449 A1 | 6/2006 | Park | |
| 2007/0243897 A1 | 10/2007 | Maatta et al. | |
| 2009/0215507 A1 * | 8/2009 | Park | 455/575.4 |
| 2011/0299235 A1 | 12/2011 | Liu et al. | |

FOREIGN PATENT DOCUMENTS

WO 2008/074358 A1 6/2008

OTHER PUBLICATIONS

Alonso Nogueiro, M.; Examiner; Extended European Search Report from related European Patent Application No. 12173381.0 dated Feb. 13, 2013; 10 pages.
Alonso Nogueiro, M.; Examiner; Article 94(3) EPC from related European Patent Application No. 12173381.0 dated Feb. 17, 2014; 6 pages.

* cited by examiner

*Primary Examiner* — Anthony Haughton
(74) *Attorney, Agent, or Firm* — Fitch, Even, Tabin & Flannery LLP

(57) ABSTRACT

A housing has a front surface and a back surface. A keyboard and a corresponding bottom surface move between a non-deployed configuration and a deployed configuration. A tray slides in and out of the housing along one or more slots that are formed internal to the housing. This tray can include an internal surface having a first side that contacts the keyboard and an opposing second side that contacts the aforementioned bottom surface when the latter components are non-deployed. When moving to the deployed configuration the keyboard and bottom surface first move substantially parallel to the housing and then move substantially perpendicular to the housing. Projections on these components can interact with corresponding tracks formed in the housing to direct at the least this perpendicular movement.

15 Claims, 4 Drawing Sheets

APPARATUS PERTAINING TO A DEPLOYABLE KEYBOARD AND CORRESPONDING BOTTOM SURFACE

FIELD OF TECHNOLOGY

The present disclosure relates to electronic devices and more particularly to keyboards.

BACKGROUND

Data and instruction-entry keyboards of various kinds are known in the art. Keyboards are typically comprised of a plurality of keycaps (such as depressible buttons, touch-sensitive surfaces, and so forth) that permit a user to selectively enter any of a variety of alphanumeric characters and/or to input corresponding instructions or selections. Two common examples in these regards are the so-called QWERTY keyboard and the so-called telephone keypad.

Small portable communication devices (such as so-called smartphones) often include a keyboard. To minimize the device's footprint those keyboards are sometimes disposed on a lower plane than the device's display. In these cases the display and the keyboard sometimes slide parallel to one another to bring the keyboard into a deployed position. In some other cases the keyboard comprises two or more multi-row segments that pivot in a planar fashion with respect to one another to permit the keyboard segments to be stored, again parallel to the device's display, as a stack of planar members within the device.

DETAILED DESCRIPTION

Figure 1:
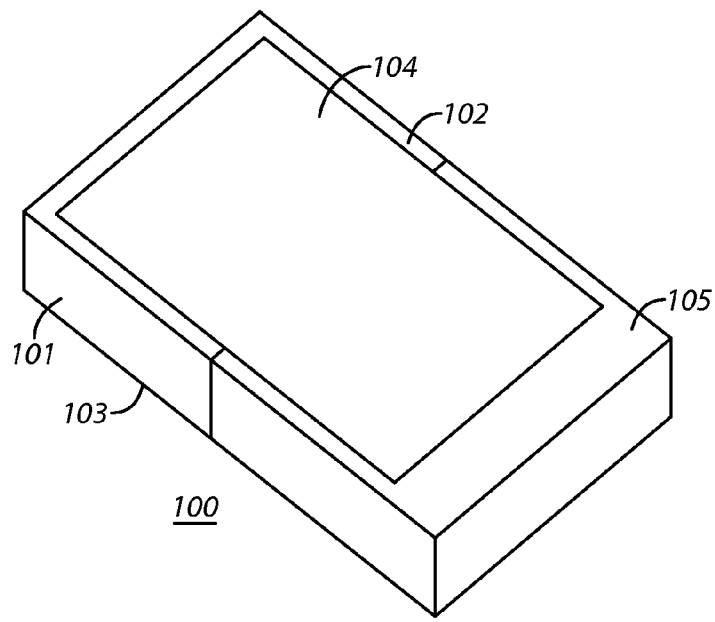
FIG. 1 is a perspective schematic view in accordance with the disclosure.

The following describes an apparatus pertaining to a housing having a front surface and a back surface, and further comprising a keyboard. The keyboard is configured to move between a non-deployed configuration and a deployed configuration. In the non-deployed configuration the keyboard is at least partially disposed within the housing. In the deployed configuration the keyboard is disposed substantially planar with the front surface of the housing.

By one approach the apparatus further includes a bottom surface that also moves between a non-deployed configuration and a deployed configuration in synchronization with movement of the keyboard. This bottom surface is similarly disposed at least partially within the housing when in the non-deployed configuration and is substantially flush with the back surface of the housing when in the deployed configuration.

By one approach the apparatus also comprises a tray that moves out of and into the housing by sliding along one or more guide slots that are formed internal to the housing. This tray can include an internal surface having a first side that contacts the keyboard when the latter is non-deployed and an opposing second side that contacts the aforementioned bottom surface when the latter is non-deployed.

By one approach, when moving from the non-deployed configuration to the deployed configuration the keyboard first moves substantially parallel to the housing and then substantially perpendicular to the housing. By one approach, the keyboard can have one or more projections that interact with corresponding tracks formed in the housing to direct at the least this perpendicular movement of the keyboard. If desired, the bottom surface can be similarly configured to behave in a similar manner.

So configured, a corresponding device such as a portable communication device can have both a small footprint when the keyboard is non-deployed while also offering a keyboard that can be readily and easily deployed when needed. The keyboard can be at least substantially flush with the front surface of the device to facilitate ease of use and offer an attractive aesthetic appearance. Similarly, the underside of the device can be smooth and without substantial interruption or surface discontinuity to thereby improve the use, stability, and feel of the device. These teachings are highly leverageable and are also easily scaled to accommodate a wide variety of device types and application settings.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

FIG. 1 presents a view of an apparatus 100 having a housing 101 that presents a front surface 102 and a back surface 103. In this illustrative example the apparatus 100 has a display 104 that comprises a part of that front surface 102. In this example the apparatus 100 also includes a tray 105 that is configured to slide out of and into the housing 101.

Figure 2:
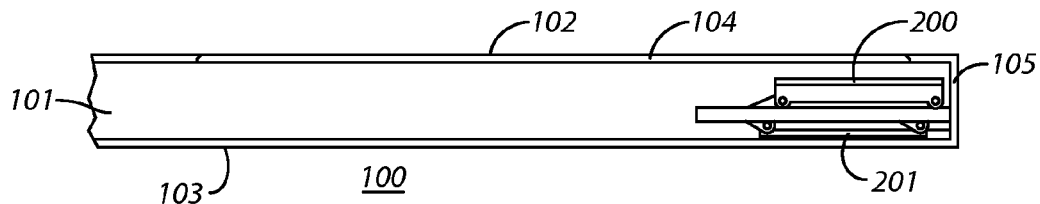
FIG. 2 is a side-elevational schematic view in accordance with the disclosure.

Referring to FIG. 2, this tray 105 serves, in part, to at least partially contain a keyboard 200 and a corresponding bottom surface 201. FIG. 2 depicts both of these components in a fully non-deployed configuration. In this configuration both of these components are nested within the apparatus 100 and, as part of this configuration, are withdrawn longitudinally within the confines of the apparatus 100. So configured, neither the keyboard 200 nor the bottom surface 201 are visually observable from outside the apparatus 100.

Figure 3:
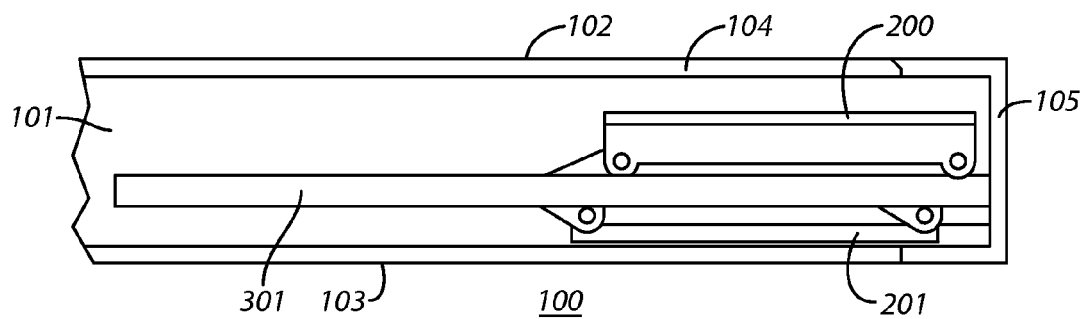
FIG. 3 is a side-elevational schematic view in accordance with the disclosure.

FIG. 3 provides an enlarged view of the keyboard 200 and the bottom surface 201 in the non-deployed configuration. In this illustrative example the tray 105 includes an internal surface 301. These teachings will accommodate a variety of approaches in these regards. By one approach, for example, this internal surface 301 comprises a rectangularly-shaped plate. In this example, when in the fully non-deployed position shown the keyboard 200 contacts a first side of this internal surface 301 while the bottom surface 201 contacts an opposing second side of the internal surface 301.

Figure 4:
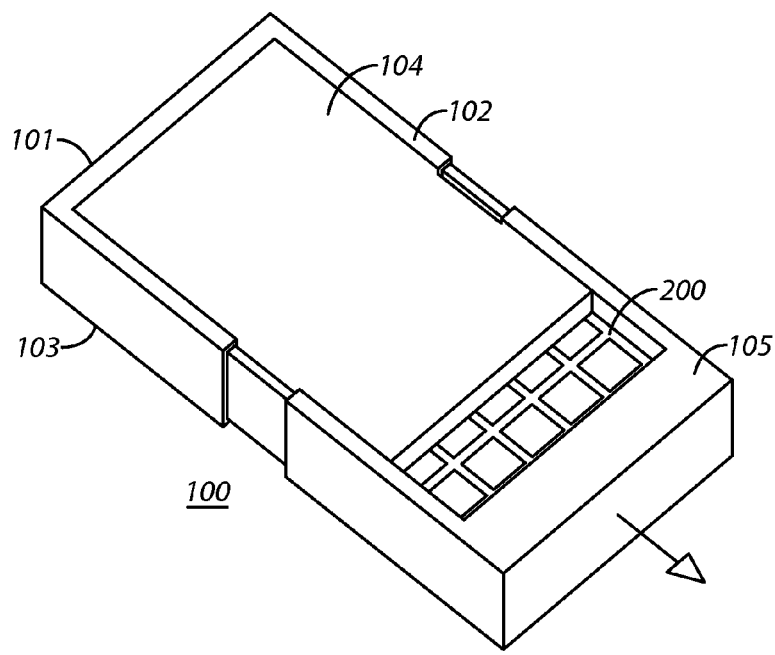
FIG. 4 is a perspective schematic view in accordance with the disclosure.

As noted above, the tray 105 slides with respect to the housing 101. FIG. 4 depicts the apparatus 100 with the tray 105 sliding forward towards a fully-opened position. As the tray 105 slides forward the keyboard 200 becomes partially visible to a properly-positioned external observer. In this example the keyboard 200 initially remains in contact with the aforementioned internal surface 301 as the tray 105 moves and hence the keyboard 200 moves substantially parallel to the housing 101 during this movement. Also in this example, the bottom surface 201 remains in contact with the internal surface 301 as the tray 105 slides forward toward the fully-opened position.

Figure 5:
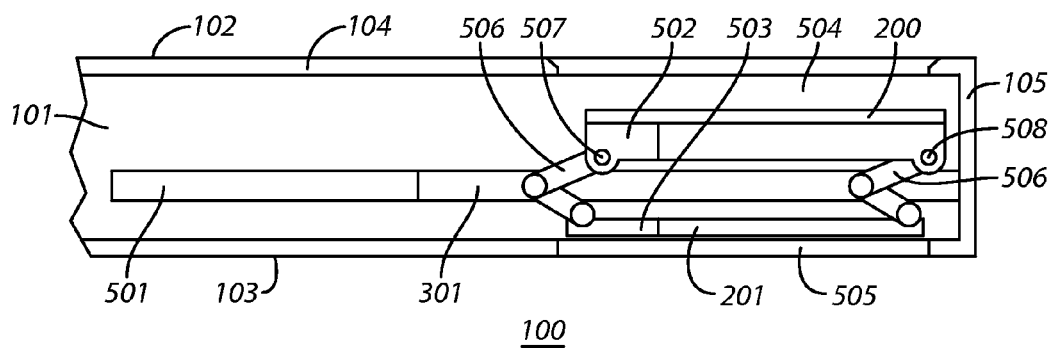
FIG. 5 is a side-elevational schematic view in accordance with the disclosure.

FIG. 5 provides further elaboration in these regards. Here it can be perhaps more clearly seen that both the keyboard 200 and the bottom surface 201 are traveling in lockstep and in contact with the tray's internal surface 301. By one approach, the internal surface 301 moves by sliding along a guide slot 501 formed on the internal sides of the housing 101. By one approach, if desired, this sliding engagement can rely upon wheels (not shown) that fit within the aforementioned slots 501 and that freely rotate about axles (not shown) attached to the sides of the internal surface 301. By another approach, and as shown in this illustrative example, the side edges of the internal surface 301 extend into and slide along the aforementioned slots 501.

FIG. 5 also illustrates that the housing 101 can include tracks 502 and 503 that are also formed in the internal side walls thereof. In this example, both opposing side walls of the housing 101 include such tracks 502 and 503 and the tracks 502 and 503 are substantially straight and disposed substantially perpendicular to the longitudinal axis of the apparatus 100. By one approach these tracks 502 and 503 are formed by small flanges that extend outwardly of the housing's side walls. By another approach these tracks 502 and 503 comprise corresponding slots formed in the housing's side walls.

FIG. 5 further illustrates that openings 504 and 505 are formed on both the front surface 102 and back surface 103 of the apparatus 100 as the tray 105 moves to a fully-opened position. These openings 504 and 505 occur because the keyboard 200 and the bottom surface 201 remain in a perpendicularly-withdrawn state as shown (in contact, at least for the most part, with the internal surface 301) as the tray 105 moves forward.

Figure 6:
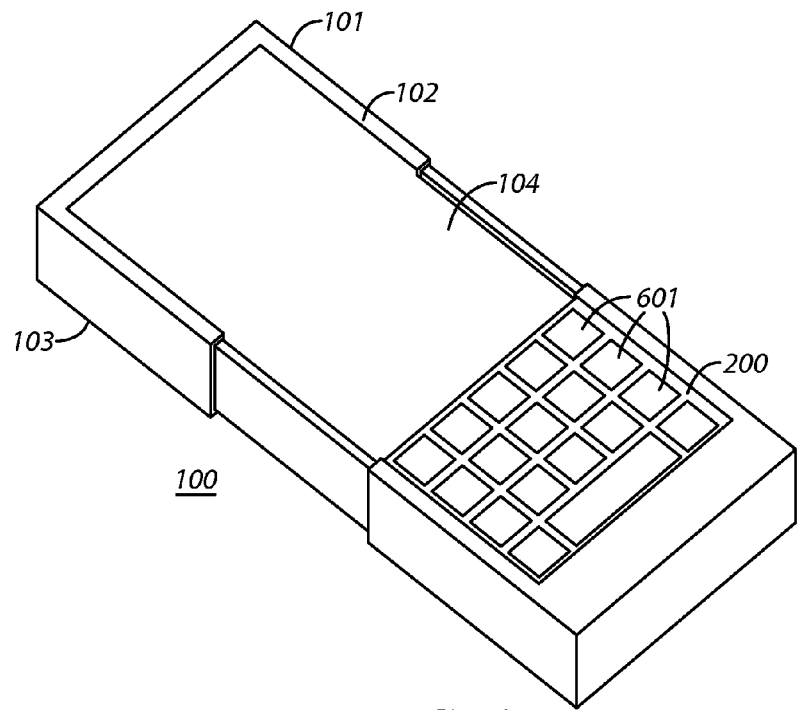
FIG. 6 is a perspective schematic view in accordance with the disclosure.

Eventually, however, as the tray 105 nears a fully-withdrawn state both the keyboard 200 and the bottom surface 201 move substantially perpendicular to the housing 101. As this occurs, and as illustrated in FIGS. 6 and 7, both the keyboard 200 and the bottom surface 201 move substantially perpendicular to the longitudinal axis of the housing 101 and in opposition to one another to both become substantially planar and flush with the front surface 102 and back surface 103, respectively.

Figure 7:
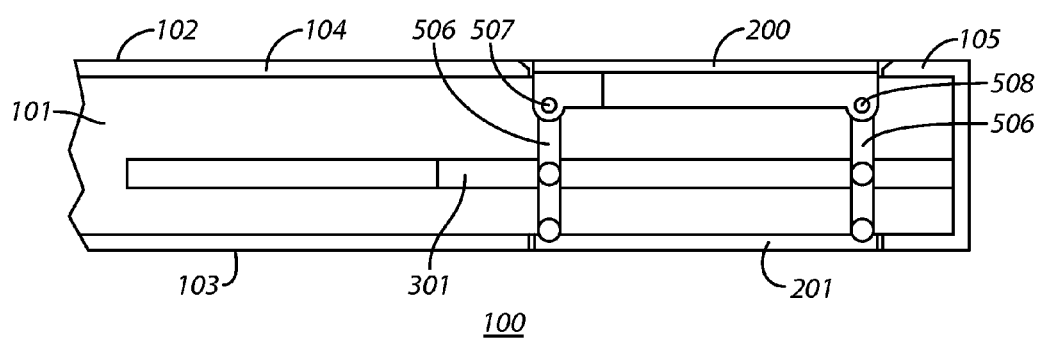
FIG. 7 is a side-elevational schematic view in accordance with the disclosure.

With reference to both FIGS. 5 and 7, this perpendicular movement of the keyboard 200 is owing, in this illustrative example, to linkage arms 506 that pivotally couple to the interior surface 301 at one end of a first arm 506 and to a rotating wheel 507 and 508 at an opposing end thereof. These wheels 507 and 508, in turn, connect to the keyboard 200 via corresponding axles. The rearward wheels 507, in turn, track and follow corresponding ones of the aforementioned tracks 502.

As the rearward wheels 507 follow their individual tracks 502, the corresponding linkage arms 506 follow accordingly to thereby move the keyboard 200 from the perpendicularly-withdrawn state shown in FIG. 5 to a fully-deployed state as shown in FIG. 7 such that the keyboard 200 becomes substantially planar with respect to the front surface 102 of the housing 101.

In this illustrative embodiment the forward wheels 508 do not follow a corresponding track. Instead, the linkage arm 506 coupled to the forward wheel 508 simply follows the perpendicular movement of the keyboard 200 as described above to provide some additional support for the keyboard 200 in the deployed configuration. If desired, however, a similar track as described above could be provided to specifically guide this forward wheel 508 as well.

In this illustrative example a similar construct serves to move the bottom surface 201 perpendicular to the longitudinal axis of the housing 101 and opposite to the movement of the keyboard 200 as described above. So configured, as the tray 105 assumes a fully-withdrawn position the aforementioned openings 504 and 505 are effectively closed and filled by the keyboard 200 and bottom surface 201, respectively. This yields an apparatus 100 having a smooth and solid feel that is both aesthetically pleasing and physically supportive of robust use of the keyboard 200.

By moving the tray 105 in a reverse direction to that described above, the foregoing components similarly reverse their movements. Accordingly, as the tray 105 closes, the keyboard 200 and bottom surface 201 withdraw perpendicularly into the tray 105 and into contact with the interior surface 301 and then move parallel to the housing 101 as the tray 105 continues sliding to a closed position.

These teachings are suitable for use with a wide variety of keyboards. As shown in FIG. 6, the keyboard 200 can include as many, or as few, keys (a few of which are denoted by reference numeral 601) as may be desired to meet the needs of a given application setting. As a more specific example in these regards, but without intending any limitations in these regards, the keyboard 200 can comprise a full QWERTY keyboard if desired.

So configured, the apparatus 100 has a relatively small footprint when the keyboard 200 is stored in a non-deployed configuration. As the tray 105 moves outwardly, however, the keyboard 200 moves as described to a deployed configuration. Similarly, the bottom surface 201 moves in synchronization with the movement of the keyboard 200 to also reach a deployed configuration. In both cases, the openings 504 and 505 that are created by moving the tray 105 outwardly of the housing 101 become at least substantially filled by the keyboard 200 and bottom surface 201.

Figure 8:
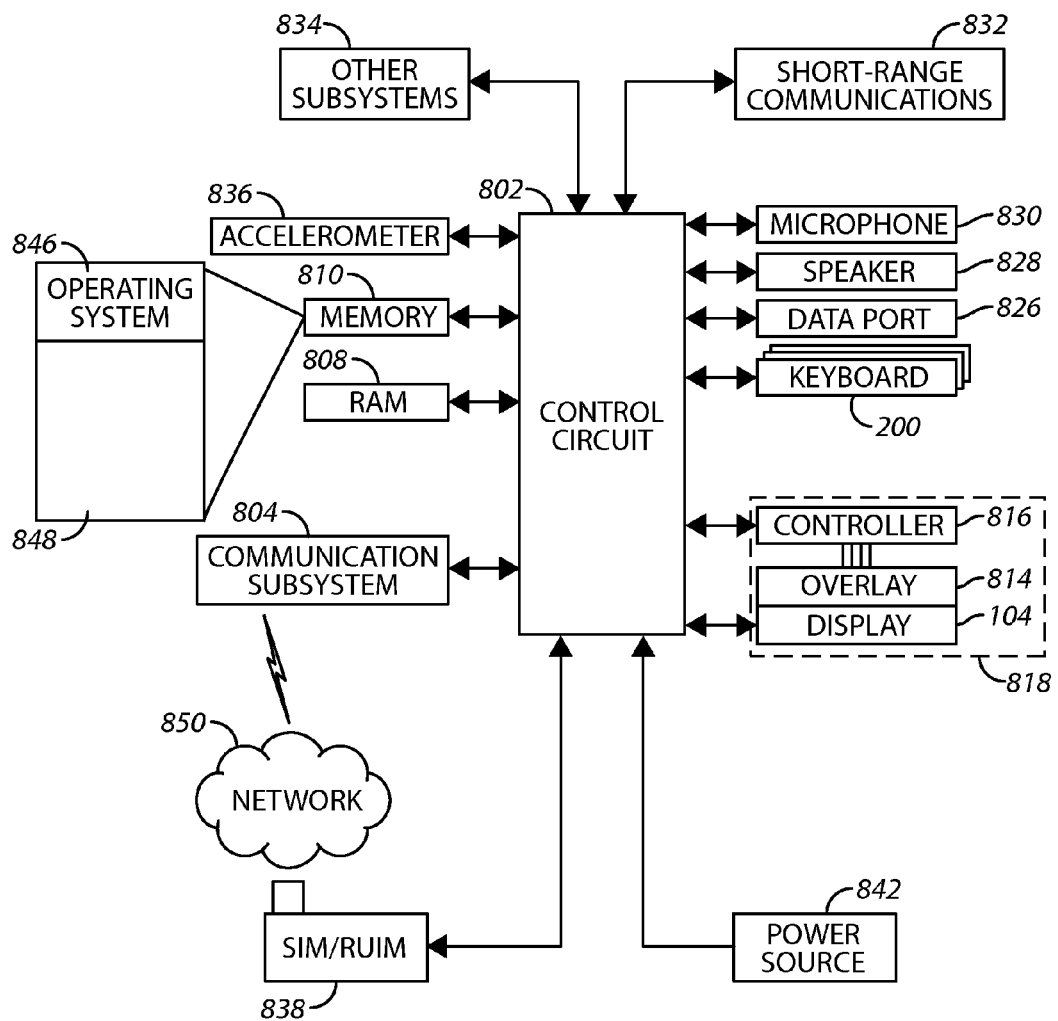
FIG. 8 is a block diagram in accordance with the disclosure.

These teachings are suitable for use with a wide variety of apparatuses. This can include, for example, a portable electronic device of choice. Referring to FIG. 8, an exemplary portable electronic device includes a control circuit 802 that controls the overall operation of the portable electronic device. Communication functions, including data and voice communications, are performed through a communication subsystem 804. The communication subsystem receives messages from and sends messages to a wireless network 850. The wireless network 850 may be any type of wireless network, including, but not limited to, data wireless networks, voice wireless networks, and networks that support both voice and data communications. A power source 842, such as one or more rechargeable batteries or a port to an external power supply, powers the electronic device.

The control circuit 802 interacts with other elements, such as a Random Access Memory (RAM) 808, a memory 810, the aforementioned display 104 along with a touch-sensitive overlay 814 operably coupled to an electronic controller 816 that together comprise an optional touch-sensitive display 818, the aforementioned keypad 200, a data port 826, a speaker 828, a microphone 830, a short-range communication subsystem 832, and other device subsystems 834 of choice.

In this example, the control circuit 802 also interacts with an accelerometer 836 that may be utilized to detect direction of gravitational forces or gravity-induced reaction forces. To identify a subscriber for network access, the portable electronic device may utilize a Subscriber Identity Module or a Removable User Identity Module (SIM/RUIM) card 838 for communication with a network, such as the wireless network 850. Alternatively, user identification information may be programmed into the memory 810.

The portable electronic device includes an operating system 846 and software programs, applications, or components 848 that are executed by the control circuit 802 and are typically stored in a persistent, updatable store such as the memory 810. Additional applications or programs may be loaded onto the portable electronic device through the wireless network 850, the data port 826, the short-range communications subsystem 832, or any other suitable subsystem 834. The memory 810 may comprise a non-transitory storage media that stores executable code, when executed, causes one or more functions or actions of choice to be undertaken.

By one approach, the control circuit 802 can be configured to automatically respond to the deployed and non-deployed state of the keyboard 200 and/or the bottom surface 201 in any of a variety of ways. As one simple example in these regards, when the keyboard 200 is fully deployed the control circuit 802 can present, via the display 104, a user interface that presumes data entry via the keyboard 200. When, however, the keyboard 200 is stowed in the non-deployed configuration as described above, the control circuit 802 can be configured to present instead a user interface that presumes data entry via the touch-based overlay 814.

The present disclosure may be embodied in other specific forms without departing from its essential characteristics. For example, if desired, one or more blocking or locking mechanisms (such as a stop, detent, tongue-and-groove arrangement, tab, hook, or the like) can be provided to hold one or both of the aforementioned keyboard 200 and/or bottom surface 201 in the deployed and/or the non-deployed configurations.

The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. An apparatus comprising:
a housing having a front surface and a back surface;
a keyboard configured to move between a non-deployed configuration and a deployed configuration, wherein when in the non-deployed configuration the keyboard is disposed within the housing and when in the deployed configuration the keyboard is substantially planar with the front surface of the housing; and
a bottom surface configured to move between a non-deployed configuration and a deployed configuration in synchronization with movement of the keyboard, wherein when in the non-deployed configuration the bottom surface is disposed within the housing and when in the deployed configuration the bottom surface is substantially flush with the back surface of the housing.

2. The apparatus of claim 1 wherein the apparatus comprises a portable communications device.

3. The apparatus of claim 2 further comprising:
a display comprising a part of the front surface of the housing.

4. The apparatus of claim 1 wherein the keyboard comprises, at the least, a QWERTY keyboard.

5. The apparatus of claim 1 further comprising:
a tray configured to slide out of and into the housing.

6. The apparatus of claim 1 wherein the keyboard is configured to, when moving from the non-deployed configuration to the deployed configuration, first move substantially parallel to the housing and then move substantially perpendicular to the housing.

7. The apparatus of claim 6 wherein at least one projection on the keyboard interacts with at least one track formed in the housing to direct the perpendicular movement of the keyboard with respect to the housing.

8. The apparatus of claim 1 wherein the bottom surface is configured to, when moving from the non-deployed configuration to the deployed configuration, first move substantially parallel to the housing and then move substantially perpendicular to the housing.

9. The apparatus of claim 8 wherein at least one projection on the bottom surface interacts with at least one track formed in the housing to direct the perpendicular movement of the bottom surface with respect to the housing.

10. The apparatus of claim 5 wherein the tray further comprises an internal surface having a first side that contacts the keyboard when the keyboard is in the non-deployed configuration and an opposing second side that contacts the bottom surface when the bottom surface is in the non-deployed configuration.

11. The apparatus of claim 10 wherein the internal surface moves with the tray as the tray slides in and out of the housing.

12. The apparatus of claim 5 wherein the tray slides along at least one slot formed internal to the housing.

13. A portable communications device comprising:
a housing having a front surface and a back surface;
a display supported by the housing facing outwardly away from the front surface of the housing;
a keyboard configured to move between a non-deployed configuration and a deployed configuration, wherein when in the non-deployed configuration the keyboard is disposed within the housing and when in the deployed configuration the keyboard is substantially planar with the front surface of the housing;
a bottom surface configured to move between a non-deployed configuration and a deployed configuration in synchronization with movement of the keyboard, wherein when in the non-deployed configuration the bottom surface is disposed within the housing and when in the deployed configuration the bottom surface is substantially flush with the back surface of the housing.

14. The portable communications device of claim 13 further comprising:
a tray configured to slide out of and into the housing.

15. The apparatus of claim 14 wherein the tray slides along at least one slot formed internal to the housing and wherein the keyboard is configured to move in conjunction with sliding of the tray such that, when moving from the non-deployed configuration to the deployed configuration, the keyboard first moves substantially parallel to the housing and then moves substantially perpendicular to the housing.

* * * * *